United States Patent [19]

Calvin

[11] Patent Number: 5,765,815
[45] Date of Patent: Jun. 16, 1998

[54] ROTARY VALVE WITH PRESSURIZED ENERGIZED SEAL

[75] Inventor: Douglas G. Calvin, Missouri City, Tex.

[73] Assignee: Keystone International Holdings Corp., Houston, Tex.

[21] Appl. No.: 802,522

[22] Filed: Feb. 20, 1997

Related U.S. Application Data

[63] Continuation of Ser. No. 489,554, Jun. 12, 1995, abandoned.

[51] Int. Cl.$^6$ ............................................. F06K 5/00
[52] U.S. Cl. .................... 251/175; 251/298; 251/317.01
[58] Field of Search ................................. 251/304, 175, 251/298, 306, 314, 317.01

[56] References Cited

U.S. PATENT DOCUMENTS

| | | | |
|---|---|---|---|
| 2,844,353 | 7/1958 | Gurries | 251/175 |
| 2,852,226 | 9/1958 | Wheatley. | |
| 2,923,523 | 2/1960 | Taylor | 251/306 X |
| 3,347,516 | 10/1967 | Linde. | |
| 3,404,864 | 10/1968 | Reddy. | |
| 3,501,127 | 3/1970 | Freeman | 251/175 |
| 3,990,676 | 11/1976 | Brownstein. | |
| 4,154,426 | 5/1979 | Santy et al. | |
| 4,253,641 | 3/1981 | Van Ryck | 251/306 |
| 4,410,007 | 10/1983 | Karpenko | 251/175 X |
| 4,604,254 | 8/1986 | Yamamoto. | |

OTHER PUBLICATIONS

1988 Ballcentric Valve brochure of Keystone Valve U.S.A., Inc.

*Primary Examiner*—John Fox
*Attorney, Agent, or Firm*—Browning Bushman

[57] ABSTRACT

A rotary valve is provided including a valve element mounted within the flow path of a valve body and rotatable about a stem axis. A peripheral seating surface on the valve body surrounds the flow path through the valve body and is spaced from the stem axis for sealing engagement with the valve element when rotated to its closed position. The peripheral seating surface on the valve body is preferably annular, and more preferably has an arcuate cross-sectional configuration and includes a central annular seating line spaced closer to the center point of the valve than adjoining upstream and downstream portions of the seating surface. The valve element includes a rigid body with a peripheral resilient overlay. The resilient overlay has a peripheral pressure-responsive sealing member for flexing in response to fluid pressure into sealing engagement with the seating surface. A peripheral backup shoulder is provided on the rigid body of the valve element for preventing extrusion of the sealing member under high pressure when the valve element is in engagement with the annular seating surface. The concepts of the present invention are particularly well suited for a plug valve and provide reliable sealing engagement between the plug and the seating surface when a high pressure differential exists across the closed valve.

13 Claims, 4 Drawing Sheets

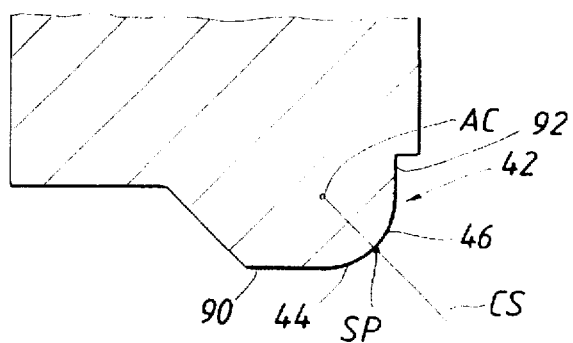
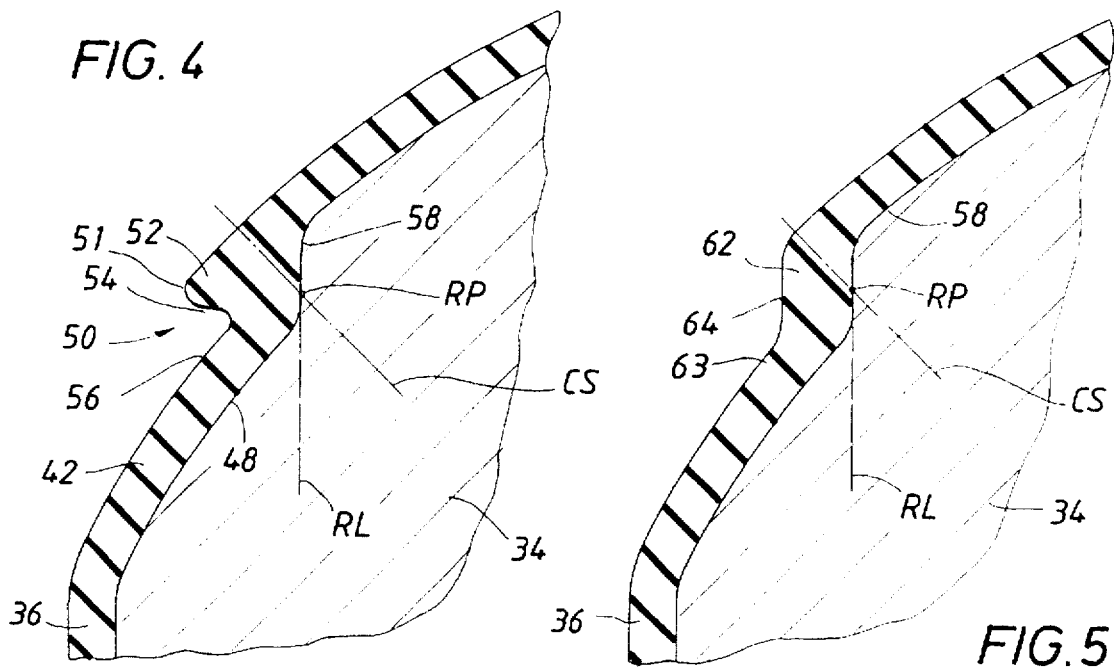
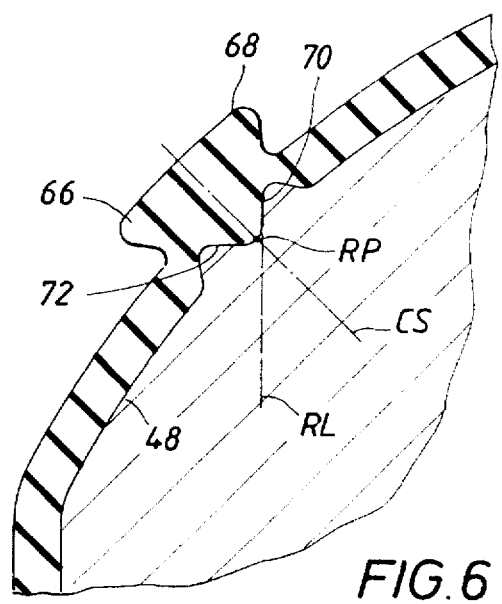
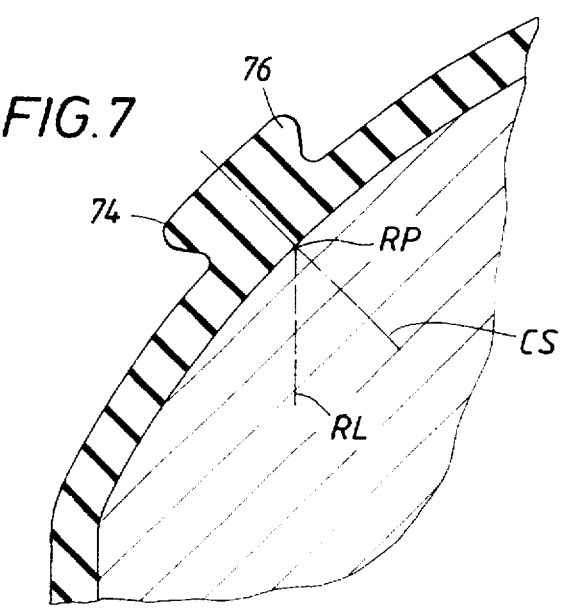

ROTARY VALVE WITH PRESSURIZED ENERGIZED SEAL

This is a continuation of U.S. application Ser. No. 08/489,554, filed on Jun. 12, 1995 now abandoned.

BACKGROUND OF THE INVENTION

1. Field of the Invention

The present invention relates to rotary valves for controlling fluid flow. More particularly, this invention relates to a rotary valve with a valve member having a peripherally extending resilient overlay for sealing engagement with a peripheral seating surface on the valve body that is spaced from the valve stem axis.

2. Description of the Background

Rotary valves are distinct from other valves in that the valve member rotates within the valve body to create and break a seal with the seating surface, thereby effecting closing and opening of the valve. Rotary valves are frequently quarter turn valves, meaning that the valve member rotates 90° between its fully closed to its fully opened positions.

One type of quarter turn rotary valve is referred to as a plug valve, which employs a valve element or plug having an external sealing surface and a cut-out or through port for transmitting fluid through the valve when the plug is rotated to its open position. Plug valves have long been preferred for controlling fluid flow in certain industries, particularly those wherein the fluid is a sludge or slurry, or when solid particles are transmitted through the valve with the fluid. U.S. Pat. No. 3,347,516 discloses such a plug valve with valve seat spaced from the stem axis. The valve element or plug has a frustoconical-shaped outer surface to seal with an inner surface of the valve body, with a cutout in the plug allowing fluid passage when the plug is rotated to its open position.

Another type of plug valve is marketed by Keystone Valve USA, Inc. under the "Ballcentric" trademark. The seating surface of this valve body is also spaced from the axis of the valve stem, and the plug has a generally hemi-spherical shape. When the eccentric plug is rotated to its closed position, the external wall of the plug seals with the annular seating surface on the valve body. When the plug is rotated 90°, the valve element is moved to the side of the valve body and out of the flow path to allow unobstructed flow through the valve. The Ballcentric valve improves flow characteristics through the valve and reduces pressure drop across the valve compared with plug valves having a conventional passageway through the plug. In order to improve valve sealing reliability, the metallic valve element has been coated with an elastomeric overlay so that the overlay seals with the seating surface to obtain a fluid-tight seal when the valve is in its closed position.

U.S. Pat. No. 2,852,226 discloses a plug valve with a flexible sealing plate provided on the plug body. The plug is of the traditional type with a passageway through the plug to allow fluid flow through the valve. The sealing plate includes a circumferential flange intended to be continuously pressed against the inner surface of the plug valve. The specification indicates that fluid pressure will urge the flange into tighter sealing engagement with the fluid line, and a pair of sealing plates are provided on opposing sides of the valve stem.

U.S. Pat. No. 3,404,864 discloses a rotary valve wherein the valve element is in the shape of a tube. As shown in FIGS. 13 and 14, a valving tube may be fitted over a valve extension tube, with an external periphery of the valving tube forming a lip that is biased by pressure toward the wall.

U.S. Pat. No. 3,990,676 discloses a sealing gasket on a valve element. The sealing gasket may include opposing lips for shutting off flow of fluid under pressure from either of the upstream port or downstream port of the valve.

Plug valves are preferably designed so that the valve element seals fluid flow when the valve is closed regardless of the direction fluid pressure is applied to the valve. Plug valves may be installed with the intent of fluid passing primarily in one direction through the valve, e.g., from an upstream high pressure side of the valve to a downstream low pressure side of the valve. The valve should ideally be able to seal fluid flow in the reverse direction, however, so that a leak occurring between two plug valves in a system can be isolated, with high pressure being maintained on opposing sides of the two closed plug valves.

One of the problems particularly associated with rotary valves having seating surfaces offset from the valve stem axis concerns the difficulty of maintaining sealing engagement between the plug and the seat when fluid pressure is pressing the plug toward the valve stem axis and thus away from the seat, while maintaining long seal life if opposing fluid pressure forces the plug toward tighter sealing engagement with the seat. This problem is compounded when the valve member includes a resilient overlay to enhance sealing reliability, as explained above, since the metallic plug body moves with respect to the valve stem axis in response to the fluid pressure differential, and since the resilient overlay also moves with respect to the metallic plug body in response to this same pressure differential across the closed valve. Traditional techniques for dealing with this dilemma have included the use of harder or less resilient overlays on the plug, increased plug-to-seat interference, and/or reduction in the "play" or maximum axial movement of the plug with respect to the seat. However, the benefits of an overlay are reduced if the elastomer becomes less resilient. Increased plug-to-seat inference results in increased torque requirements to operate the valve, thereby resulting in larger and more expensive stems, bearings, operators, and related components. Reducing play between the components results in increased manufacturing costs, use of more durable, and thus more expensive, components, and more frequent valve maintenance.

Thus, there has been a long-felt but unfulfilled need for an improved rotary valve that offers high sealing reliability and long seal life with a resilient overlay on a valve element adapted for engagement with a seat spaced from the valve stem axis.

The disadvantages of the prior art are overcome by the present invention, and an improved rotary valve is hereinafter disclosed for reliably sealing fluid flow. The techniques of the present invention are particularly well suited for use with a plug valve having a resilient overlay on a rigid valve body wherein the annular seating surface is offset from the valve stem and the plug responds to varying fluid pressure by slight axial movement.

SUMMARY OF THE INVENTION

A rotary valve body has a fluid flow path with a central axis and the valve element such as a plug mounted therein and rotatable about a stem axis. An annular seating surface on the valve body is spaced from the stem axis for sealing engagement with the plug when rotated to its closed position. The valve member includes a rigid body and a resilient overlay secured to the rigid body for fluid-type sealing engagement with the annular seat.

According to the present invention, the intersection (or approximate intersection) of the flow path axis with the stem axis defines a center point of the valve. The annular seating surface on the valve body includes a central annular seating line formed by center seating points within cross-sectional planes including the flow path central axis. The rigid body of the valve element has an exterior annular reference line defined by reference points each coincident with a side of a reference cone having a base defined by the central annular seating line when the valve is in its closed position and a vertex defined by the center point of the valve.

The resilient overlay includes a pressure-responsive, peripheral sealing member spaced from the sides of the reference cone and outwardly with respect to the center point of the valve from an adjoining portion of the overlay spaced further from the reference cone for flexing into sealing engagement with the peripheral seating surface when the valve is in its closed position. In a preferred embodiment, the sealing member and seating surface are annular. In a more preferred embodiment, the rigid body of the valve element includes an annular backup shoulder spaced outwardly from the exterior annular reference line with respect to the center point of the valve for preventing extrusion of the sealing member under high pressure when the valve member is in engagement with the annular seating surface. In another embodiment, the resilient overlay includes a central annular portion coincident with the sides of the reference cone for sealing engagement with the annular seating line of the seating surface, and a pressure-responsive, annular portion spaced from the sides of the cone such that the central annular portion and the pressure-responsive, annular portion form a conterminous seal with the annular seating surface.

The pressure-responsive, annular sealing member may define a resilient lip protruding outwardly from the center point of the valve and defining an annular groove between the lip and an inward portion of the resilient overlay spaced toward the central axis. When the lip is spaced opposite the stem axis with respect to the sides of the reference cone, the annular backup shoulder is spaced between the sides of the reference cone and the stem axis. The central annular seating line of the seating surface is preferably closer to the center point of the valve than remaining adjoining upstream and adjoining downstream portions of the annular seating surface. The seating surface may have a generally arcuate cross-sectional configuration, with an arc center spaced outwardly from the center point of the valve with respect to the seating surface and substantially along a line passing from the center point of the valve through the central annular seating line.

The valve element may be a Ballcentric valve as described above or any plug valve with a cut-out flow path therein for transmitting fluid through the valve when the valve member is rotated to the open position. Both first and second pressure-responsive portions of the sealing member may be provided each for flexing into sealing engagement with the seating surface in response to fluid pressure applied to either the upstream or downstream side of the valve, and a backup shoulder may be provided on each side of the reference cone for preventing extrusion of the pressure-responsive portion on the opposite side of the reference cone, which otherwise would tend to occur in response to a high fluid pressure differential across the sealing member.

It is an object of the present invention to provide an improved rotary valve with a pressure-responsive, resilient, peripheral overlay on the valve element for reliable sealing engagement with a peripheral seat on the valve body.

It is a further object of this invention to provide an improved rotary valve capable of a fluid-tight seal when the closed valve element moves with respect to the valve body in response to fluid pressure on either the upstream or downstream side of the valve.

It is yet another object of this invention to provide a relatively low cost and highly reliable valve that does not require high maintenance.

It is a feature of the present invention that a resilient overlay is provided on a quarter turn plug having a metal seat on the valve body substantially offset from the stem axis, and with the valve element including an annular backup shoulder positioned for preventing extrusion of the resilient sealing member when subject to high fluid pressure.

Yet another feature of the invention is that a seating surface on the valve body has an arcuate cross-sectional configuration with a center seating line lying closer to the center point of the valve than upstream and downstream portions of the seating surface, and that the resilient overlay has a central portion coincident with the sides of the reference cone and a pressure-responsive, annular portion spaced from the sides of the reference cone, with these resilient overlay portions forming a seal conterminous in cross-section with the annular seating surface.

Still another feature of this invention is that the resilient overlay includes a center portion for sealing engagement with the center annular seating line of the seating surface and a pressure-responsive, annular lip for sealing engagement with an adjoining portion of the seating surface, with the center point and lip forming a seal with the annular seating surface conterminous in cross-section.

It is an advantage of the present invention that material for the resilient overlay may be selected with little concern for extrusion, since the backup shoulder substantially minimizes or prevents extrusion.

It is a further advantage of the invention that the valve may be manufactured from materials and according to component tolerances that allow axial movement of the valve element with respect to the valve body, while nevertheless maintaining highly reliable sealing engagement between the valve member and the seat on the valve body when subject to high fluid pressure.

These and further objects, features, and advantages of the present invention will become apparent from the following detailed description wherein reference is made to the figures in the accompanying drawings.

BRIEF DESCRIPTION OF THE DRAWINGS

FIG. 3 is a detailed cross-sectional view of a seating surface on the valve body as generally shown in FIG. 1.

FIG. 4 is a cross-sectional view of a portion of the valve element generally shown in FIG. 1, with the overlay including a lip.

FIG. 5 is an alternate embodiment of a portion of the valve element shown in FIG. 4, with the pressure-responsive portion of the overlay not including a lip.

FIG. 6 is another embodiment of a portion of the valve element shown in FIG. 4, and illustrating opposing lip seals and a pair of corresponding backup shoulders.

FIG. 7 is yet another embodiment of a portion of the valve element shown in FIG. 4, and illustrating a pair of seals without backup shoulders.

DETAILED DESCRIPTION OF THE PREFERRED EMBODIMENT

Figure 2:
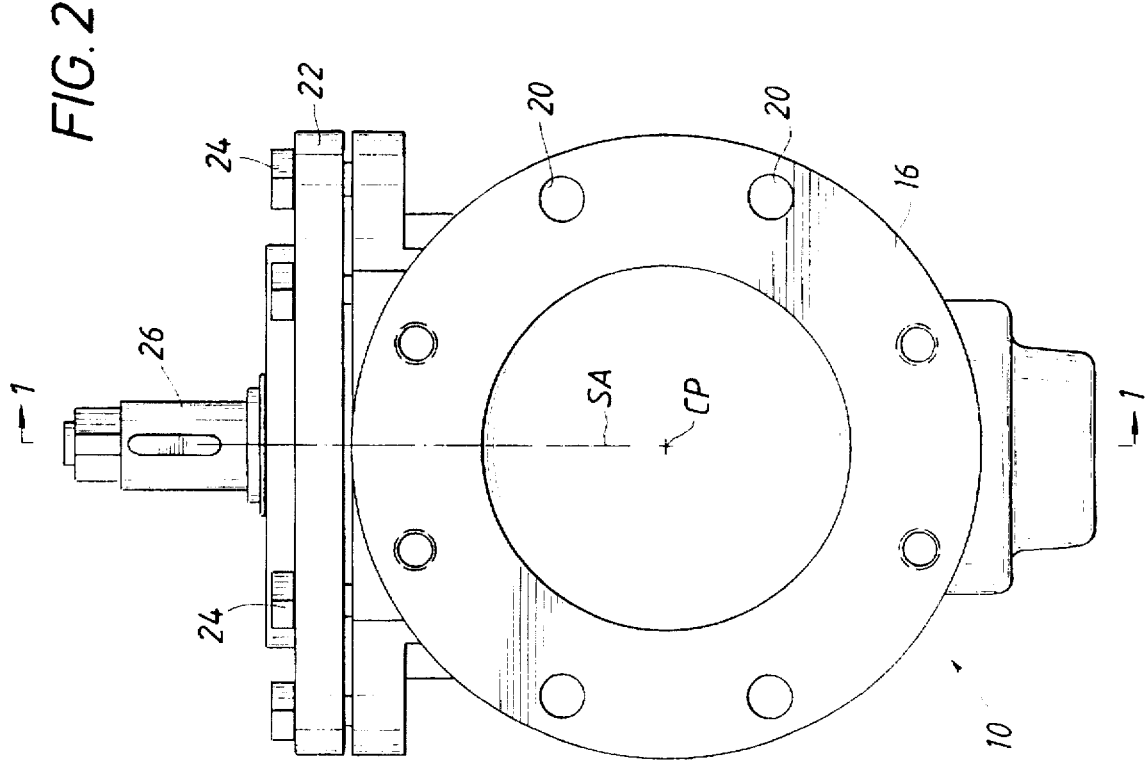
FIG. 2 is an end pictorial view of a plug valve according to the present invention.
Figure 1:
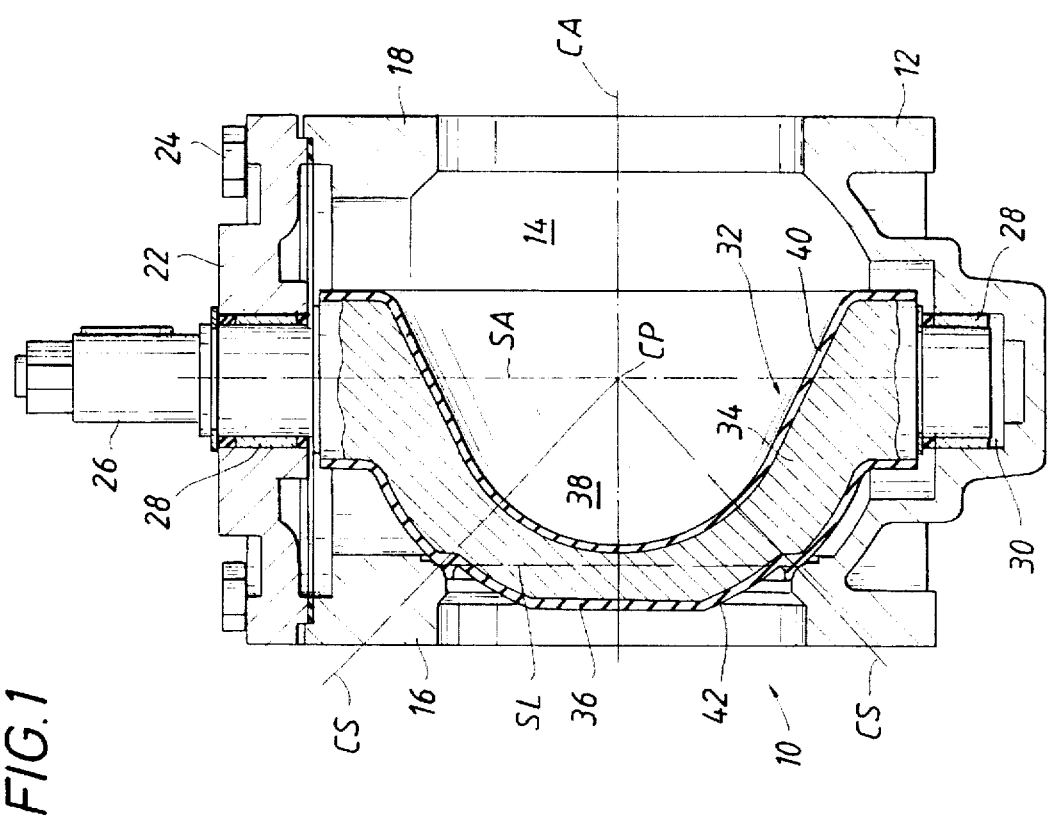
FIG. 1 is a cross-section of a plug valve according to the present invention taken along lines 1—1 in FIG. 2.

A rotary plug valve 10 according to the present invention is generally shown in FIGS. 1 and 2. Valve body 12 includes a flow path 14 therethrough for passing fluid through the valve. The flow path 14 has a central axis CA that is preferably a straight line through the valve body, although the concepts of the present invention may be utilized with a valve having, for example, one port oriented at 45° or 90° with respect to the other port.

For the valve as depicted in FIGS. 1 and 2, the valve body forms a fluid inlet flange 16 and an outlet flange 18 each having a circular port therein formed about axis CA. Each flange 16, 18 may include conventional holes 20 for securing the valve body to respective pipe flanges. An upper cap or bonnet 22 may be secured to the top of the valve body by bolts 24. A valve stem 26 is rotatable with respect to the body about stem axis SA. Bushings 28 are provided for rotatably mounting both the upper and lower ends of the stem to the valve body. Fluid-tight sealing between the stem and body is provided by conventional sealing members. The valve body 12 defines a cylindrical lower cavity 30 therein to receive the lower end of the stem so that the valve element and stem may be removed from the valve body by unbolting the bonnet 22 and lifting the components through the opening in the top of the valve body.

With reference to FIG. 1, the valve element 32 is fixedly secured to the stem 26 and includes a metallic rigid body 34 with an elastomeric, and thus resilient, overlay 36 secured to the body 34. The valve element 32 has a generally semi-spherical shape, with a semi-cylindrical center portion 38 providing a "full bore" passageway through the valve when the element 32 is rotated to its open position. The overlay 36 may be formed in a conventional manner by injection molding the elastomer on the body 34, with the body 34 centrally positioned within a mold cavity having generally the same shape but being slightly larger than the body. The generally cylindrical shape of the inner resilient layer 40 on the inner surface of the body 34 provides corrosion protection and longer life of the valve element. The outer, generally spherical-shaped layer 42 serves the same function and provides a resilient seal for sealing the valve element with the valve body.

With reference to FIGS. 1, 2, and 3, the metal seating surface 44 on the valve body surrounds the flow line central axis CA and is substantially spaced from the stem axis SA. The intersection or approximate intersection of central axis CA and stem axis SA defines a center point CP of the valve body and thus the valve. Seating surface 44 has an arcuate, convex cross-sectional configuration within a cross-sectional plane including the flow path central axis; the axis CA lies entirely within the cross-sectional plane. With reference now to FIG. 3, the arcuate, convex cross-sectional configuration of the seating surface has an arc center AC spaced radially from the center point CP of the valve body with respect to the seating surface. The annular seating surface is convex in the sense that it has a central annular seating line SL formed by center seating points SP closer to the center point CP of the valve body than the remaining upstream and downstream portions of the seating surface (see FIGS. 1 and 3). In other words, each cross-sectional plane of the seating surface includes two such points SP on opposite sides of the axis CA, and the rotation of the cross-sectional plane about axis CA creates a seating line SL formed by these points. The arc center AC of each cross-sectional configuration of the arcuate seating surface is preferably spaced substantially along a straight line passing from the center point CP of the valve body through a corresponding central annular seating point.

Again, under the assumption that fluid flow is from the left to the right through the valve depicted in FIG. 1, the cross-section of each seating surface as shown in FIG. 2 thus includes an upstream portion 44 and a downstream portion 46 on opposing sides of the seating point SP. The entirety of the cross-sectional seating surface 42 is spaced in the valve body between an adjoining interior upstream valve body surface 90 and an adjoining downstream valve body surface 92 on the downstream side of seating line SL, with neither of the surfaces 90 or 92 serving a sealing function with the valve member 32.

With reference to FIG. 4, the rigid body 34 of the valve member has a generally spherical-shaped outer surface 48 with a resilient overlay 42 that includes a pressure-responsive, peripheral sealing member 50. Sealing member 50 is spaced outwardly from the surface 48 with respect to the central axis CA, and takes the form of an annular lip 52 protruding outwardly from the valve stem axis and defining an annular groove 54 spaced between the lip and an adjacent portion 56 of the overlay spaced from the lip toward the central axis CA of the valve when the valve is in its closed position. The groove 54 thus lies along a line extending between the cantilevered end 51 of the lip and the center point of the valve (in a cross-sectional view).

To gain a better understanding of the present invention, it is convenient to define a reference cone as shown in FIG. 1, which has a base defined by the central annular seating line SL and a vertex defined by the center point CP of the valve. The rigid body 34 of the valve member 32 has an external reference line RL defined by reference points RP, each coincident with the sides CS of the reference cone when the valve element is rotated to its closed position. As shown in FIG. 4, the annular sealing member 50 is spaced outwardly from the exterior annular reference line with respect to the center point of the valve and may flex into sealing engagement with the annular seating surface when the valve is in its closed position, as explained subsequently in detail. Sealing member 50 is spaced from the sides CS of the reference cone and outwardly with respect to center point CP from an adjoining portion of the overlay 36 spaced further from the reference cone.

In a preferred embodiment of the present invention, the rigid body 34 of the valve member includes an annular backup shoulder 58 spaced outwardly from the corresponding reference point RP on the rigid body with respect to the center point CP of the valve. This backup shoulder substantially minimizes or prevents extrusion of the sealing member by fluid pressure when the sealing member is in engagement with the annular seating surface. If the sealing member 50 is spaced between the sides CS of the reference cone and the central axis CA, the shoulder 58 is spaced between sides CS and the stem axis.

For the embodiment as shown in FIG. 4, the backup shoulder 58 is spaced between sides CS of the reference cone and the stem axis SA, and a majority portion of the annular sealing member 50 is spaced opposite the stem axis with respect to sides CS. The central outer surface of the rigid body 34 of the valve member 32 may be flattened, as shown in FIG. 1, thereby reducing the weight of the valve element and minimizing its extension of the valve member from the seating line SL with respect to the center point of the valve. The outer surface of the valve body 34 extending outwardly from the shoulder with respect to the central axis CA may return to the generally spherical shape 48 (so that the shoulder forms a hump in the valve body), or may continue toward the valve stem at approximately the maximum diameter of the hump with respect to the center point of the valve, as shown in FIG. 4.

Figure 8:
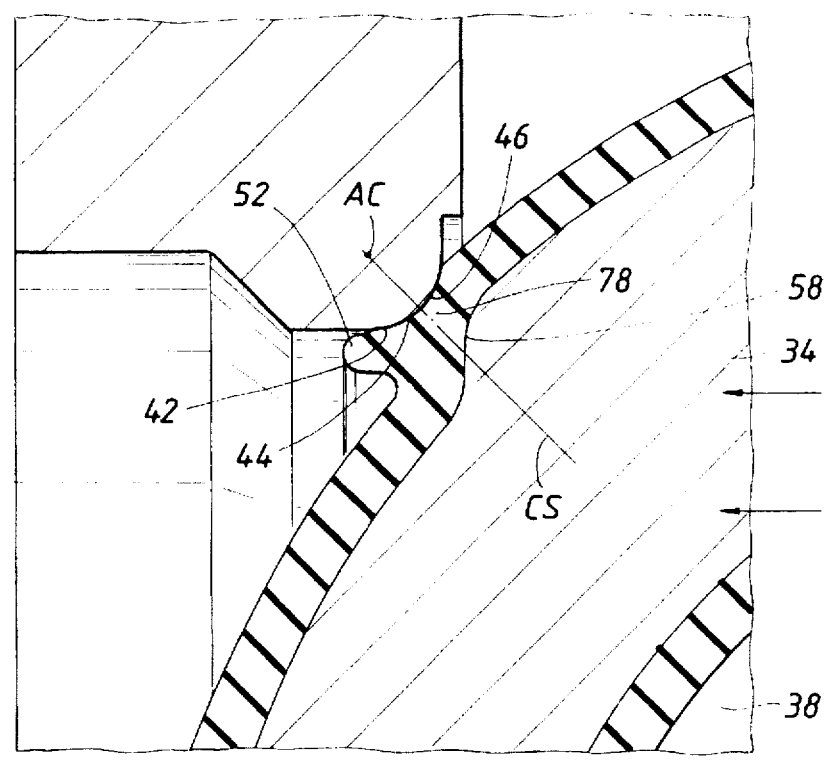
FIG. 8 illustrates the portion of the valve element as shown in FIG. 4 in sealing engagement with the seating surface, with fluid pressure being applied from the right side toward the seating surface.
Figure 9:
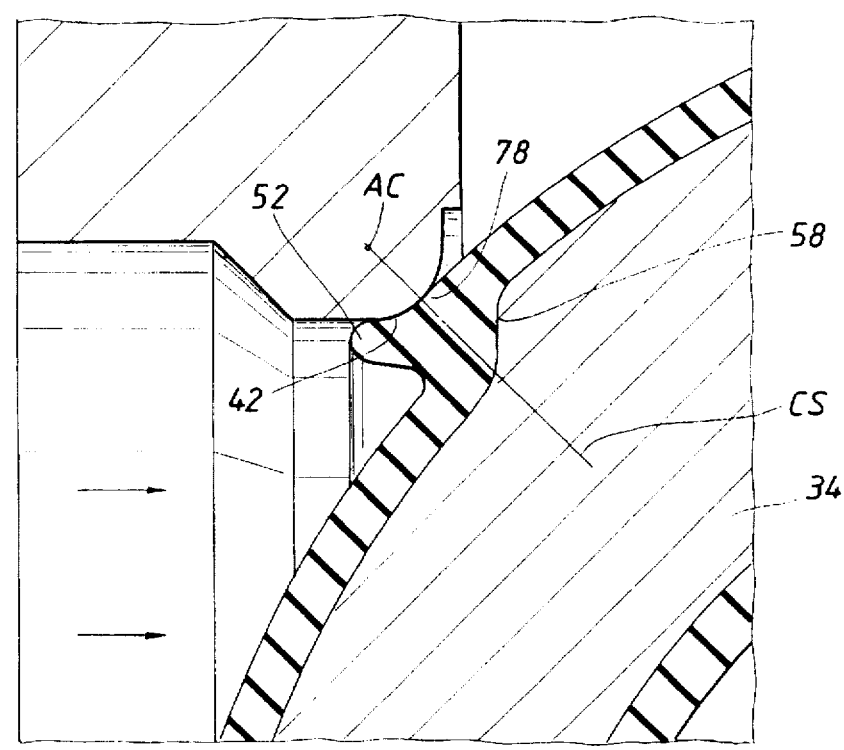
FIG. 9 illustrates the embodiment as shown in FIG. 8 with fluid pressure being applied from the left side and pressing the valve element away from the seating surface.

The FIG. 4 embodiment of a valve member is depicted in FIGS. 8 and 9, illustrating the axial movement of the valve member in response to fluid pressure. This movement is typically less than 0.010 inch, but is exaggerated in the figures to illustrate the concepts of the invention. In the FIG. 8 illustration, fluid pressure is applied from the downstream or right side of the valve, thereby moving the valve element slightly closer to the seating surface 42. Engagement of the lip 52 with the seating surface causes the outer surface of the lip to assume the generally curvilinear cross-sectional configuration of the seating surface. Fluid pressure on the valve element causes the downstream portion 46 of the seating surface to be in sealing engagement with the resilient overlay, although a portion of the upstream portion 44 is also forced into engagement with a portion of the outer surface of the lip 52. Since the valve element is forced closer to the valve body seating surface, an increase of fluid pressure creates an even tighter seal to prevent fluid flow through the valve, even though the lip 52 itself is not subject to this increased fluid pressure.

For the illustration shown in FIG. 9, fluid pressure pushes the valve member away from the seating surface 42, and a fluid-tight seal is obtained by the lip 52 pressing outwardly with respect to the central axis CA. Again, increased fluid pressure forces the lip into tighter sealing engagement with the seating surface. If the backup shoulder 58 is not provided, a high pressure differential across the valve element would tend to extrude the lip 52 between the rigid body 34 and the seating surface, thereby breaking the seal. The valve would, of course, then lose its sealing function, and the entire valve element would likely have to be replaced since the annular lip 52 is integral with the rigid body 34 and would likely be ruined. The present invention avoids this problem by utilizing a backup shoulder 58 to prevent extrusion, even when the rigid body moves away from the seating surface in response to high fluid pressure.

FIG. 5 discloses an alternative embodiment of the rigid body valve member of the present invention. The difference between the embodiments of FIG. 4 and 5 relates to the cross-sectional configuration of the annular sealing member. Even when the valve element is not in engagement with the seating surface, the embodiment shown in FIG. 4 forms a pressure-responsive lip and a groove 54 as discussed above. This lip may, however, allow debris or "trash" passing through the valve to become caught in the lip and thereby interfere with an effective seal between the seating surface and the valve element when the valve is rotated to its closed position. In the currently preferred embodiments for most valve sizes, this lip may be less pronounced than as shown in FIG. 4 but nevertheless is provided to increase sealing effectiveness when the valve element moves away from the seating surface in response to fluid pressure.

In the embodiment as shown in FIG. 5, however, a lip and groove is not provided, and the relaxed sealing member 62 may have an outer surface 64 that lies within a vertical plane; i.e., surface 64 is co-planar with the stem axis SA. Nevertheless, in this embodiment the majority of member 62 is spaced opposite the stem axis SA with respect to the sides CS of the reference cone. Member 62 is also pressure-responsive, since it extends outwardly (with respect to center point CP) from its adjoining portion 63 of the overlay spaced further from the sides of the reference cone. When fluid pressure is applied to the sealing member 62 and presses the resilient overlay 36 toward the seating surface 42, a slight lip and groove may be formed as a result of the compressed annular sealing member. Even for the FIG. 5 embodiment, however, an effective low pressure seal can be maintained, and the shoulder 58 substantially enhances sealing effectiveness by minimizing the likelihood that the sealing member 62 will be extruded between the seating surface and the rigid body of the sealing element.

FIG. 6 discloses a double lip seal, double backup shoulder embodiment according to the present invention. The annular sealing member comprises a first pressure-responsive, lip portion 66 that is spaced opposite the stem axis with respect to the sides CS of the reference cone, and a second pressure-responsive, lip portion 68 spaced between the sides CS of the reference cone and the stem axis. A first backup shoulder 70 is spaced between the sides CS of the reference cone of the stem axis SA for preventing extrusion of the first lip 66, while a second backup shoulder 72 is spaced opposite the stem axis with respect to the sides of the reference cone to prevent extrusion of the lip 68. For the embodiment as shown in FIG. 6, the outer surface 48 of the rigid body has a generally spherical-shaped uniform diameter on both the upstream and downstream sides of the backup shoulders.

FIG. 7 discloses yet another embodiment of the present invention with a sealing member including lips 74 and 76 on opposing sides of the reference cone, but with no backup shoulders to prevent extrusion. In still another embodiment, which is discussed below, the double lip sealing member as shown in FIG. 7 may be provided in conjunction with a single backup shoulder. Since extrusion of the lip is more likely when fluid pressure moves the valve element away from the seating surface, this latter embodiment preferably would include a shoulder between the side CS of the reference cone and the stem axis for preventing extrusion of lip 74.

Figure 10:
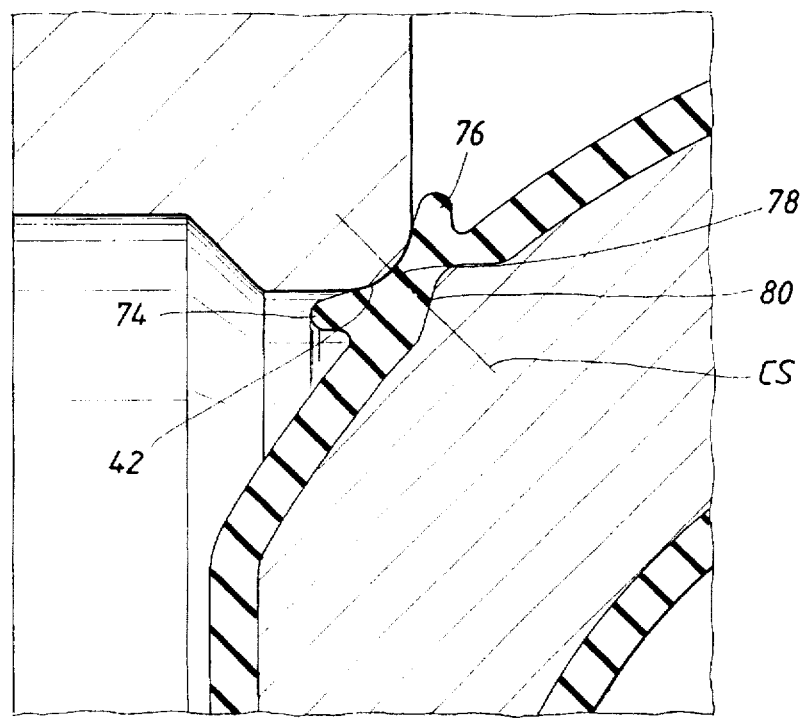
FIG. 10 illustrates yet another embodiment of a valve member in engagement with the seating surface, and without substantial fluid pressure being applied to the valve element.

FIG. 10 illustrates this embodiment in sealing engagement with the seating surface 42 previously described. It should be understood that the embodiment as shown in FIG. 7 is practically also depicted if the shoulders are eliminated, and that the embodiment as shown in FIG. 6 is practically depicted if both shoulders are provided. In FIG. 10, the valve element is shown in sealing engagement with the surface 42, although little, if any, fluid pressure is applied to the valve element. The outer surface of the sealing element is compressed to conform to the generally arcuate cross-sectional configuration of the seating surface. When little or no fluid pressure differential exists across the closed valve element, the seal is nevertheless obtained by fluid-tight engagement of the sealing element with the seating surface. When fluid pressure is applied to move the valve element away from the seating surface 42, it may be understood that the lip that is pressurized by the fluid pressure may be substantially deformed. The lip not subject to high fluid pressure retains substantially its original configuration, with most, if not all, of the effective seal being between the pressure energized lip and the seating surface.

Figure 11:
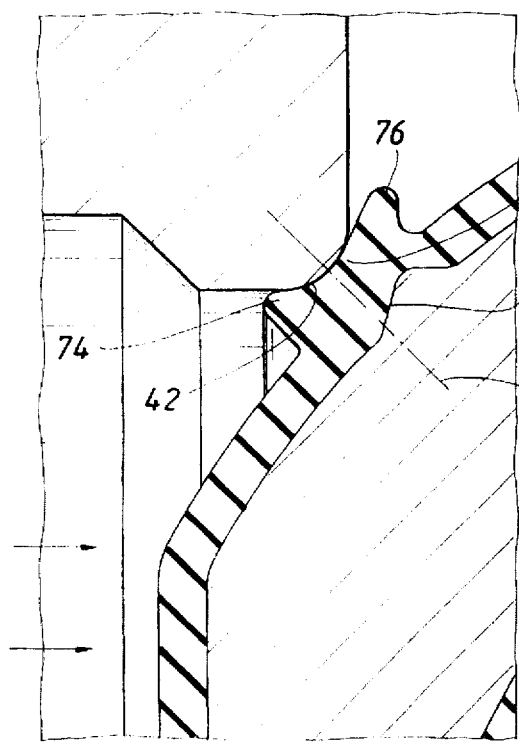
FIG. 11 illustrates the embodiment as shown in FIG. 10 with fluid pressure being applied from the left to force the valve element away from the seating surface.
Figure 12:
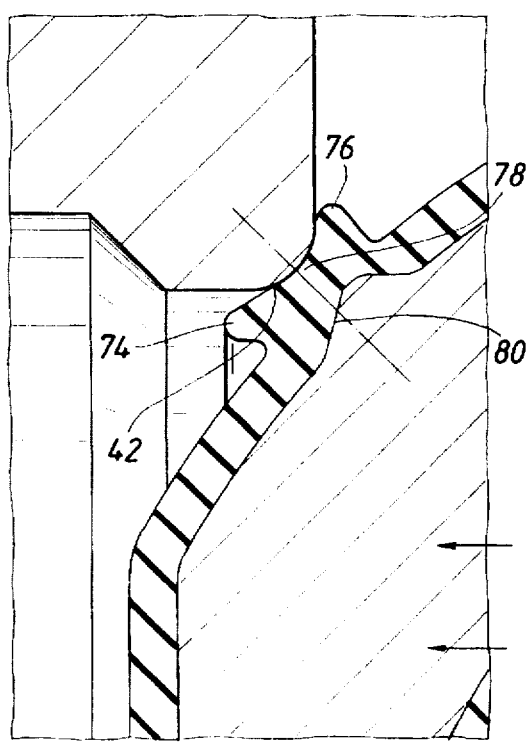
FIG. 12 illustrates the embodiment as shown in FIG. 10 with fluid pressure being applied from the right to force the valve element toward the seating surface.

FIG. 11 illustrates fluid pressure moving the valve element slightly away from the seating surface, with the single shoulder 80 particularly being useful for minimizing extrusion of lip 74. In FIG. 12, fluid pressure presses the valve element closer to the seating surface. While the shoulder may minimize extrusion in both the FIG. 11 and FIG. 12 embodiments, the shoulder 70 is primarily provided for minimizing extrusion of lip 74 in the FIG. 11 environment. Since the valve element in FIG. 12 is moved closer to the seating surface 42, and thus fluid pressure presses the sealing element into engagement with the seating surface, the extrusion shoulder is of less importance in this situation.

According to the present invention, each of the seating surfaces 42 preferably has a geometry as shown in FIG. 3. The seating surface 42 includes at least a substantial portion formed about arc center AC. The cross-section of the entire seating surface on the valve body is between an adjoining upstream surface 90 on the valve body and an adjoining downstream surface 92 on the body, with neither of the surfaces 90, 92 providing any seal with the resilient overlay of the valve element.

With reference to FIGS. 8–12, the resilient overlay for each of these embodiments includes a first annular portion 78 coincident with the sides CS of the reference cone for sealing engagement with the central annular seating line SL of the seating surface, and a pressure-responsive, annular portion spaced from the sides of the cone for sealing engagement with another portion of the annular seating surface, with the central annular portion and the pressure-responsive, annular portion forming a continuous seal with the cross-sectional annular seating surface. For the embodiment as shown in FIGS. 8 and 9, this pressure-responsive, annular portion is the annular lip 52 previously described, and a continuous seal between the seating surface and the sealing element is formed extending between an upstream portion 44 of the seating surface through the seating point SP as shown in FIG. 3. For the embodiment as shown in FIG. 10, this continuous seal is formed between the sealing member and the seating surface and extends between an upstream portion 44 of the seating surface through the point SP to the downstream portion 46 of the seating surface. For the embodiment as shown in FIG. 11, this continuous seal is provided between at least the upstream portion 44 of the seating surface and the point SP, while for the environment as shown in FIG. 12 this continuous seal is formed between the point SP and a downstream portion 46 of the seating surface. It is thus a significant feature of the present invention that the resilient overlay includes a central annular portion that will be in sealing engagement with the central annular seating line of the seating surface when the valve is in the closed position, while a pressure-responsive portion is also provided for engagement with the seating surface, so that in cross-section a continuous seal is obtained for reliable sealing engagement.

The concepts of the present invention are particularly well suited for a plug valve. Ball valves and other types of rotary valves frequently are designed so that the valve element does not substantially move in response to an increase in fluid pressure and, accordingly, any resilient overlay provided on such a valve element would not be as susceptible to extrusion.

Although the present invention has been particularly described with respect to a plug valve having a generally semi-spherical-shaped element, the concepts of the present invention could be used for various types of plug valves. While the valve of the present invention has been described with respect to a valve with a seating surface having a generally circular configuration, an elliptical, generally rectangular, or generally square, seating surface may be provided in the valve body, and a similarly configured annular seat provided on the valve element. In this respect, it should be understood that the term "conical" with respect to the reference cone with sides CS is intended in its broadest sense to include a reference body with a base defined by the seating surface and a vertex defined by the center point of the valve, and that the configuration of the base of the reference cone need not be circular. Also, although in the embodiments shown in the drawings and described herein, the valve element is mounted for centric rotation, the invention finds particular application to eccentrically or double-offset journalled valve elements. Such plug valves are well known to those skilled in the art, who will appreciate the applicability of the present invention thereto.

Since the concepts of the present invention substantially reduce or eliminate the likelihood of extrusion of the resilient overlay even when the closed valve element is subject to a high pressure differential, the selection of material for the overlay may be based upon primary considerations such as cost, resiliency of the material to contain a seal under high fluid pressure, and extended seal life, with concern for the extrusion of the overlay being substantially minimized.

Although several embodiments of the present invention have been described, it should be understood that the invention is not limited to the embodiments described herein and shown in the accompanying drawings. Other embodiments should be apparent to those skilled in the art based upon the concepts disclosed herein, and, accordingly, the scope of the invention is not limited to the embodiments described and illustrated but is defined by the following claims.

What is claimed is:

1. A valve, comprising:

a valve body, said valve body defining a valve cavity and having an inlet and an outlet to provide a flow path through said valve body, a peripheral seating surface having an arcuate, convex cross-sectional configuration and being formed in said valve body in surrounding relationship to said flow path;

a valve element mounted in said valve cavity for rotation between open and closed positions to control the flow of fluids through said valve body; and a peripherally extending elastomeric seal member secured to said valve element, said elastomeric seal member being disposed on said valve element such that said seal member is between said valve element and said peripheral seating surface when said valve element is in said closed position to effect a seal at said inlet between said valve element and said seating surface, said elastomeric seal member including a peripherally extending formation disposed inwardly of said peripheral seating surface when said valve element is in said closed position, said formation having a pressure-responsive surface whereby when said valve element is in said closed position, a fluid pressure from said outlet acting on said peripherally extending formation exerts a force against said pressure-responsive surface to urge said formation toward said peripheral seating surface.

2. The valve of claim 1 wherein said formation further comprises a peripherally extending recess disposed inwardly of said peripheral seating surface.

3. The valve of claim 1 wherein said peripheral seating surface is generally annular.

4. The valve of claim 3 wherein said peripherally extending formation is generally annular.

5. The valve of claim 1 wherein said valve element further comprises a peripherally extending shoulder, said shoulder being disposed closely adjacent said peripheral seating surface when said valve element is in said closed position, said shoulder serving to restrain extrusion of said seal member between said seating surface and said valve element when said fluid pressure urges said peripherally extending formation toward said peripheral seating surface.

6. The valve of claim 5 wherein said peripherally extending shoulder is generally annular.

7. The valve of claim 5 wherein said peripheral seating surface defines a first peripherally extending locus and said peripheral shoulder defines a second peripherally extending locus, said second peripherally extending locus being outward of said first peripherally extending locus.

8. The valve of claim 1 wherein said valve element comprises a plug member, said plug member being substantially encapsulated in said elastomeric material defining said elastomeric seal member.

9. A rotary valve, comprising:
a valve body having a flow path therethrough for passing fluid through said valve;
a valve element mounted within said flow path and rotatable about a stem axis to control the flow of fluid through said valve;
a peripheral seating surface on said valve body surrounding said flow path and spaced from said stem axis for sealing engagement with said valve element when said valve element is rotated to its closed position, said seating surface having a convex arcuate cross-sectional configuration;
a peripherally extending, resilient overlay secured to said valve element, said resilient overlay disposed on said valve element to form a seal between said peripheral seating surface and said valve element in said closed position, said resilient overlay including a pressure-responsive, peripherally extending lip whereby when said valve member is in said closed position, a fluid pressure acting on said lip exerts a force against said lip to urge said lip toward said peripheral seating surface.

10. The rotary valve of claim 9 wherein said pressure-responsive lip extends from said resilient overlay inwardly toward said flow path.

11. The rotary valve of claim 10 wherein said valve element further comprises a peripherally extending shoulder, said shoulder being disposed closely adjacent said peripheral seating surface when said valve element is in said closed position, said shoulder serving to restrain extrusion of said seal member between said seating surface and said valve element when said fluid pressure urges said peripherally extending formation toward said peripheral seating surface.

12. A bidirectional valve, comprising:
a valve body, said valve body defining a valve cavity and having an inlet and an outlet to provide a flow path through said valve body, a convex peripheral seating surface being formed in said valve body in surrounding relationship to said flow path, said seating surface having an upstream seat portion and a downstream seat portion;
a valve element mounted in said valve cavity for rotation between open and closed positions to control the flow of fluids through said valve body;
a peripherally extending elastomeric seal member secured to said valve element, said elastomeric seal member being disposed on said valve element such that said seal member is between said valve element and said peripheral seating surface when said valve element is in said closed position to effect a seal between said valve element and said seating surface, said elastomeric seal member including a peripherally extending formation disposed inwardly of said peripheral seating surface when said valve element is in said closed position, said formation having a pressure-responsive surface whereby when said valve element is in said closed position, an upstream fluid pressure acting on said peripherally extending formation exerts a force against said pressure-responsive surface to urge said formation toward said upstream seat portion; and
an annular portion included in said seal member, said annular portion engaging said downstream seat portion when said valve element is in said closed position to form a seal that becomes tighter in response to an increase in downstream fluid pressure to prevent flow through said valve whereby said valve is effective in preventing flow in either direction.

13. A bidirectional valve, comprising:
a valve body, said valve body defining a valve cavity and having an inlet and an outlet to provide a flow path through said valve body, a generally annular, convex peripheral seating surface being formed in said valve body in surrounding relationship to said flow path, said seating surface having an upstream seating portion and a downstream seating portion;
a valve element mounted in said valve cavity for rotation between open and closed positions to control the flow of fluids through said valve body;
a generally annular, peripherally extending elastomeric seal member secured to said valve element, said elastomeric seal member being disposed on said valve element such that said seal member is between said valve element and said peripheral seating surface when said valve element is in said closed position to effect a seal between said valve element and said seating surface, said elastomeric seal member including an annular seal portion and a generally annular, peripherally extending formation disposed inwardly of said peripheral seating surface when said valve element is in said closed position, said formation having a pressure-responsive surface whereby when said valve element is in said closed position, an inlet fluid pressure acting on said peripherally extending formation exerts a force against said pressure-responsive surface to urge said formation toward said upstream seating portion with said annular seal portion engaging said downstream seating portion to form a seal that becomes tighter in response to an increase in outlet fluid pressure; and
a generally annular, peripherally extending shoulder on said valve element, said shoulder being disposed closely adjacent said peripheral seating surface when said valve element is in said closed position, said shoulder serving to restrain extrusion of said seal member between said seating surface and said valve element when said upstream fluid pressure urges said peripherally extending formation toward said peripheral seating surface.

* * * * *